United States Patent [19]

Reibetanz et al.

[11] 4,101,238
[45] Jul. 18, 1978

[54] HOLE SAW WITH PARTICLE-ASPIRATING ACCESSORY FOR HAND DRILL

[75] Inventors: Wilbert Reibetanz, Leinfelden; Karl Wanner, Echterdingen; Klaus Voss, Stuttgart, all of Fed. Rep. of Germany

[73] Assignee: Robert Bosch GmbH, Stuttgart, Fed. Rep. of Germany

[21] Appl. No.: 757,853

[22] Filed: Jan. 10, 1977

[30] Foreign Application Priority Data

Jan. 22, 1976 [DE] Fed. Rep. of Germany ....... 2602238

[51] Int. Cl.² ......................... B23B 27/10; B23B 41/02
[52] U.S. Cl. .......................................... 408/59; 408/204
[58] Field of Search ................... 408/59, 204, 57, 58, 408/201, 205, 206

[56] References Cited

U.S. PATENT DOCUMENTS

| Re. 28,416 | 5/1975 | Hougen | 408/204 |
|---|---|---|---|
| 2,748,817 | 6/1956 | Stearns | 408/204 |
| 2,906,256 | 9/1959 | Glynn | 408/204 |
| 3,033,298 | 5/1962 | Johnson | 408/204 |
| 3,555,937 | 1/1971 | Nicodemas | 408/59 |
| 3,559,513 | 2/1971 | Hougen | 408/204 |
| 3,597,103 | 8/1971 | Birk | 408/59 |
| 3,854,840 | 12/1974 | Miyanaga | 408/204 |

Primary Examiner—Harrison L. Hinson
Attorney, Agent, or Firm—Michael J. Striker

[57] ABSTRACT

A hole saw for use in a hand drill has a cup centered on a rotation axis and having a rim centered on this axis and provided with a plurality of teeth. This cup has a shaft extending backwardly along the axis and adapted to be received in a drill chuck so that when the shaft and cup are rotated about the axis the teeth can sink into a workpiece and cut a large-diameter hole therein. The cup is formed at its base with a bore lying on the axis and opening into the cup and with a passage extending non-axially from the bore to the outer surface of the shaft. A pilot bit has a shank non-rotatably received in this bore and a tip extending axially beyond the rim of the cup so that this pilot bit serves to center the drill accessory during the start of a hole-making operation. A collar is fitted to the outside of the drill shank over the passage and is connected to aspirating means so as to aspirate particles from inside the cup. Such aspiration can be aided after the start of a drilling operation by removing the drill shank from the bore, or by forming grooves in the shank or the bore for conduction of particles backwardly to the passage.

10 Claims, 8 Drawing Figures

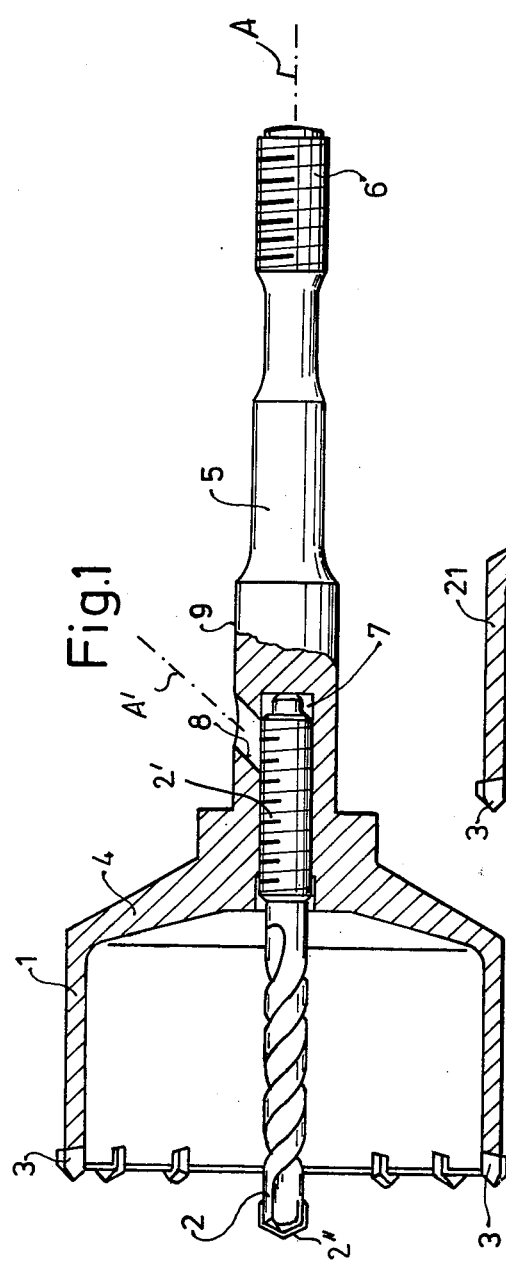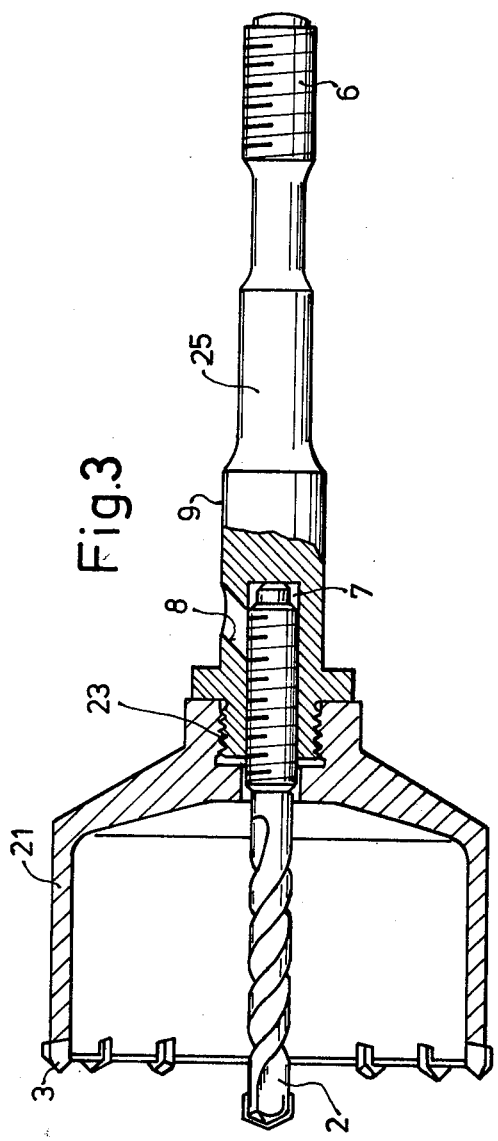

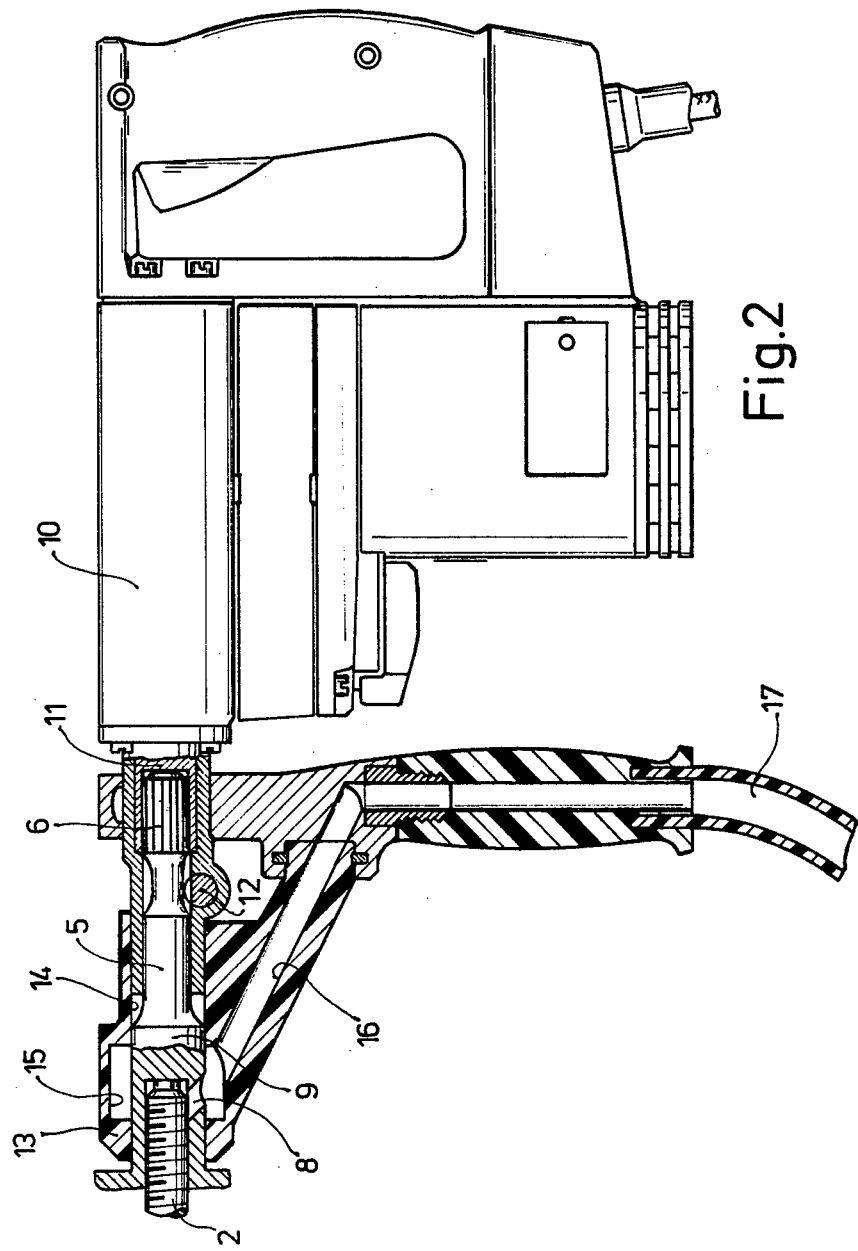

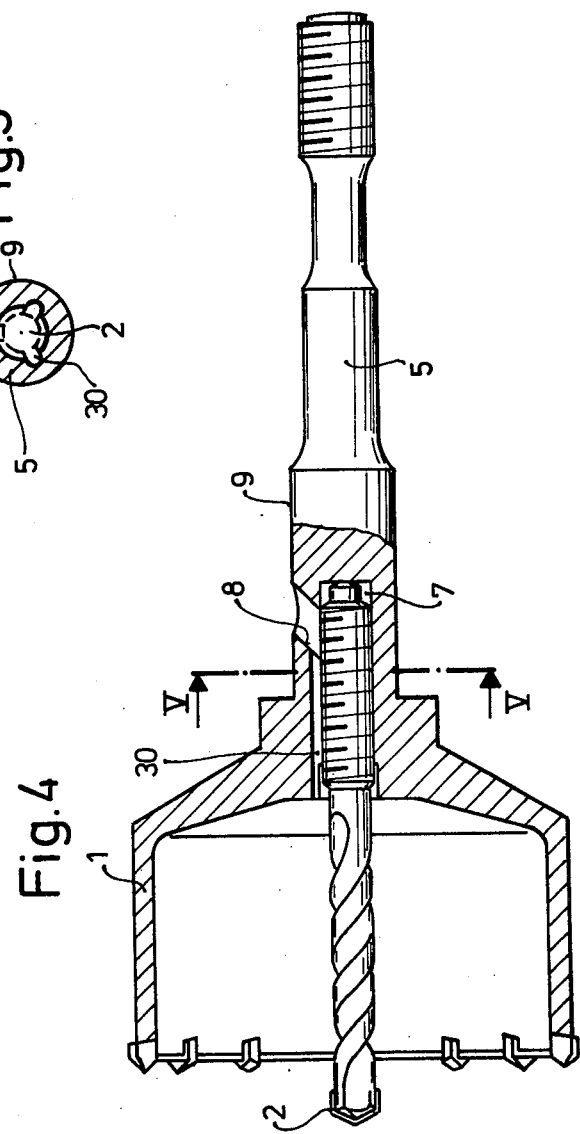

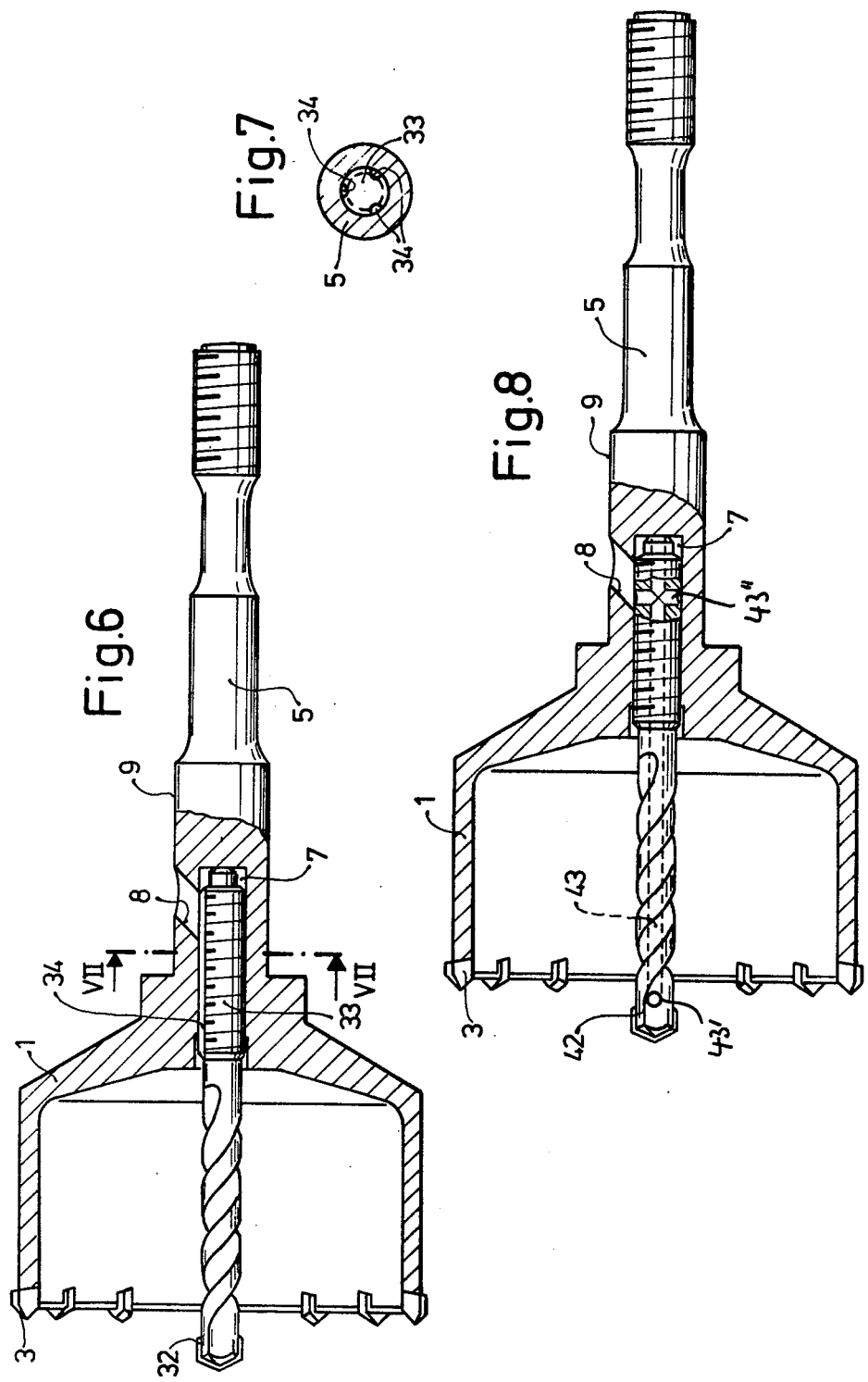

HOLE SAW WITH PARTICLE-ASPIRATING ACCESSORY FOR HAND DRILL

CROSS-REFERENCE TO RELATED APPLICATION

This application is related to the commonly assigned and copending applications Ser. Nos. 574,715 and 725,446 filed May 5, 1975 and Sept. 22, 1976, respectively, the entire disclosures of which are herewith incorporated by reference.

BACKGROUND OF THE INVENTION

The present invention relates to a drill accessory. More particularly this invention concerns a hole saw for use with an electric drill or the like.

It is necessary when, for instance, electrical work is being done often to drill relatively large-diameter holes in plaster, plasterboard, or the like. For such an operation a twist bit is completely unusable, as it is impossible to obtain the necessary large diameter. Similarly the use of a space woodboring bit or an auger bit makes the operation relatively time consuming, and furthermore even these types of bits are unsuitable when it is necessary to drill a hole greater than 1 or 2 inches in diameter.

Such a large-diameter hole is typically formed by means of a hole saw which comprises an annular cup or crown member carried on or having a shank that is received within the chuck of the drill being used. In the bottom of the annular member or cup there is a bore centered on the axis and in which is received the shank of a pilot bit whose tip projects beyond the rim of the cup. The rim of this cup is provided with a plurality of teeth. Thus the shaft of the hole saw is fitted in the chuck of a drill and the tip of the pilot bit is placed in the center of the area where the larger-diameter hole is to be drilled. On rotation of the assembly the pilot bit will drill a predetermined distance into the material, whereupon the teeth on the rim of the cup will engage the workpiece and form therein an annular groove centered on the rotation axis of the hole saw. Thereafter the entire assembly is pushed through the workpiece until the hole saw cuts therefrom an annulus having an outer diameter equal to the desired hole diameter, minus of course twice the radial thickness of the teeth.

Such an assembly allows a relatively large-diameter hole to be drilled rapidly, as the only material removal that is necessary is that removal at the circumference of the hole and in the center at the pilot bit. Unlike spade and anger bits all of the material removed is not reduced to chips or shavings.

The considerable disadvantage of this type of arrangement is that a great deal of dust is often generated. This problem is particularly troublesome when the hole saw is being used to drill plaster or stone, as the particles produced thereby are of a highly abrasive nature so that they can do considerable damage to the mechanism of the drill should they enter this mechanism. Furthermore when the hole is being drilled in an area that has furniture or carpeting in it the user must be extremely careful to cover all of the potentially damageable furnishings in order to protect them from the dust thus generated.

SUMMARY OF THE INVENTION

It is therefore an object of the present invention to provide an improved drill accessory.

Another object is the provision of such an accessory which allows the aspiration of particles from the drilling sight.

Yet another object is to improve on principles outlined in the above-identified copending applications.

A further object is to provide a hole saw which overcomes the above-given and other disadvantages.

These objects are attained according to the present invention in a drill accessory of the above-described general type, but wherein a passage is formed which opens at its inner end into the shank-receiving bore of the hole saw and at its outer end opens outside of the shank of this tool. Such construction allows particles inside and adjacent the cup to be aspirated through the bore by means of this passage. Thus a suction device such as described in the above-cited copending and commonly assigned application Ser. No. 725,446 can readily be connected to the hole saw in accordance with this invention so as to eliminate the cloud of dust normally formed when such a tool is used.

According to further features of this invention the shaft of the pilot bit is threaded into the bore in the cup and shank of the tool. This blocks the passage, but once the pilot bit has sunk in far enough so that the teeth on the cup have started to bite into the workpiece, the pilot bit can then be removed, after temporarily turning-off the tool, and the particles can then be aspirated through the bore and through the passage.

It also lies within the scope of this invention to form either the shank of the bit or the inside of the passage with a groove so that even with the shank fitted into the bore it is possible to aspirate particles through this groove and then away through the passage and the collar of the suction device fitted over the shank of the drill tool.

In accordance with yet another feature of this invention the pilot bit itself is formed with a mainly axially extending passage opening at its front end adjacent the tip of the drill and at its rear end at the passage. Thus it is possible to aspirate from the very frontmost part of the pilot bit, insuring good results.

It is possible for this tool to be used even for drilling stone, in which case the pilot bit will have a carbide tip and the teeth will be carbide chips soldered or brazed into place on the rim of the steel cup. This cup may be unitary with the shank or the shank may be formed as a separate mandrel to which the cup is threaded. In the latter case it is therefore possible to provide a whole set of cups of different diameters for the formation of holes of different diameters with the one mandrel and pilot bit.

According to this invention the aspirating means comprises a support securable to the boring implement, that is the hand drill, and a handle fixed on this support and having an outer end turned away from the support and from the implement. The implement can thus be stabilized by means of the handle. Structure is provided in the suction accessory forming a throughgoing passage extending from the tool, that is from the region on the shank at the end of the passage, through the handle to the outer end of this handle. Furthermore the suction means includes a flexible conduit connected to the handle at the outer end thereof for drawing gas and particles from the tool through the passage. The other end of this flexible conduit is connected to a suction device or a vacuum so that it is possible to hold the drill during the drilling operation by means of the auxiliary handle formed on the suction accessory and even readily to transport the drill from place to place simply by carrying it with this handle that is connected at its end to a flexible conduit leading to the vacuum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an axial section through a first embodiment of the drill accessory according to this invention;

FIG. 2 is a side view partly in axial section showing the tool of FIG. 1 in a hand drill and aspiration accessory as described in the above-cited patent application Ser. No. 725,446;

FIGS. 3 and 4 are views similar to FIG. 1 illustrating two further embodiments of the accessory according to this invention;

FIG. 5 is a section taken along line V—V of FIG. 4;

FIG. 6 is a section similar to FIG. 1 showing yet another accessory according to this invention;

FIG. 7 is a section taken along line VII—VII of FIG. 6; and

FIG. 8 is yet another section similar to FIG. 1 showing a further arrangement in accordance with this invention.

DESCRIPTION OF THE PREFERRED EMBODIMENTS

The arrangement shown in FIGS. 1 and 2 basically comprises a cup having a cylindrically annular wall 1 centered on an axis A and provided at its rim with a plurality of carbide teeth 3. This cup 1 has a base 4 in which is formed a bore 7 centered on the axis A and opening into the hollow interior of the cup 1. A pilot bit 2 has a threaded shank 2' threadedly received in the bore 7 and has a carbide tip 2" extending axially beyond the rim of the cup 1 at the teeth 3 by a distance equal to between 10 and 20 mm.

Extending backwardly from the base 4 along the axis A is a shank 5 formed at its rear end with a splined portion 6 adapted to be received within a drill chuck in the manner described in above-cited copending and commonly assigned application Ser. No 725,193.

The front part of the shank 5, that is that portion toward the cup base 4, is of slightly larger diameter than the rest of the shank 5 and has a cylindrical outer surface 9 centered on the axis A. A bore 8 extends between this outer surface 9 and the bore 7 and has an axis A' which extends at an angle of 45° to the axis A, the axis A' being inclined backwardly away from the cup 1.

FIG. 2 shows the accessory of FIG. 1 mounted in a hammer drill 10 and provided with a suction apparatus identical to that described in the commonly assigned and copending patent application Ser. No. 725,446. This device includes a support 14 that snugly surrounds the drill and has a collar 13 snugly surrounding the surface 9 at the bore 8. An inwardly open annular groove 15 in this collar 13 is connected via passage 16 that extends out through an auxiliary handle to a hose 17 and then to a suction device. Other details of this suction device can be seen in the referenced copending application. The drill 10 has an internally splined chuck 11 receiving the splined end 6 of the shank 5 and a locking rod 12 for securing this shank 5 in place.

The device according to this invention is used as follows:

To start with the tip 2" of the pilot bit 2 is pressed against a workpiece which is to be formed with a large-diameter hole. The trigger of the drill 10 is actuated and pressure is exerted in the direction of axis A against the workpiece so that the pilot bit 2 will sink into the workpiece. During this operation the shank 2' of the pilot bit 2 completely blocks the bore 7.

Once the teeth 3 have sunk into the workpiece a few millimeters, the tool 10 is turned off. The operator then unscrews the pilot bit 2 from inside the bore 7 and fits the teeth 3 back into the annular groove formed in the workpiece by these teeth 3. Drilling then commences, with the pump of the suction device turned on so that particles are aspirated from within the cup through the bore 7 and passage 6, then into the chamber 15, out the passage 16, and finally away through the hose 17. In this manner the drilling operation can proceed relatively rapidly without generating a cloud of dust.

The arrangement of FIG. 3 is identical to that of FIGS. 1 and 2 except that here the shank 5 is replaced by a mandrel 23 which is connected to a cup 21 at screw threads 23. Otherwise the cup 21 is formed the same as the cup 1 with the base 4, and the mandrel 25 is formed the same as the shank 5. Such an arrangement allows different cups 21 of different diameter to be fitted to the mandrel 25 for use of the same mandrel 25 and pilot bit 2 for drilling of holes of different diameters.

FIGS. 4 and 5 show an arrangement identical to FIG. 1, but wherein three radially inwardly open and axially extending grooves 30 are formed within the bore 7. Such an arrangement has the advantage that it is not necessary to remove the bit 2 to allow aspiration of particles via the passage 8. In this arrangement the passage 8 is connected to at least one of the grooves 30 which opens at its front end into the cup 1, so that it is possible to drill a large-diameter hole in one operation.

In FIGS. 6 and 7 an arrangement identical to FIG. 1 is shown, but here a pilot bit 32 is employed having a shank 33 formed with three radially outwardly open and axially extending grooves 34. In this arrangement, like the arrangement of FIGS. 4 and 5, it is possible to aspirate particles through the grooves 34 and passage 8 without removal of the bit 32 therefrom.

Finally FIG. 8 shows another arrangement identical to that of FIG. 1 but wherein a pilot bit 42 is employed which has an axially throughgoing central passage 43 opening at its front end at 43' adjacent the tip of the drill and at its rear end at 43" at the passage 8. In such an arrangement aspiration takes place through the passage 43 during the entire drilling operation, and is particularly effective at the beginning of the operation when the pilot bit starts to sink into the workpiece.

It is noted that any of the embodiments described above can be combined with any of the other embodiments so that, for example, a separate mandrel and cup can be employed in embodiments other than FIG. 3, and the particular grooves of FIGS. 4-8 can be used in any of the other embodiments, and even it is possible to use a grooved shank 33 in combination with a grooved bore 7.

It is also within the scope of this invention to secure the shank of the drill bit by means other than screw threads in the drill bit and bore 7. For example the drill bit could have a simple splined shaft or could be held in place by a set screw.

It will be understood that each of the elements described above, or two or more together, may also find a useful application in other types of constructions differing from the types described above.

While the invention has been illustrated and described as embodied in a hole saw, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A drill accessory comprising a cup centered on a rotation axis and having a rim centered on said axis, said cup having a shaft adapted to be received in a drill chuck and extending along said axis from said cup away from said rim, said cup being formed with a bore lying on said axis and opening into said cup, said shaft being formed with a first passage extending non-axially from said bore to the outer surface of said shaft; a second passage communicating between the cup interior and said first passage; at least one tooth on said rim, whereby rotation of said cup and shaft about said axis with said rim pressed against a workpiece will cause said tooth to cut an annular groove centered on said axis in said workpiece; and a pilot bit lying on said axis and having a shank removably received in said bore and a tip projecting axially beyond said rim.

2. The accessory defined in claim 1; further comprising means outside said cup and connected to said shaft at said first passage for aspirating particles from within said cup.

3. The accessory defined in claim 2, wherein said means includes a collar rotatably riding on said outer surface of said shaft at said first passage.

4. The accessory defined in claim 1, wherein said shaft and cup are unitary.

5. The accessory defined in claim 1, wherein said shaft and cup are separate elements, said accessory further comprising means for releasably securing said shaft and cup together for joint rotation about said axis.

6. The accessory defined in claim 1, wherein said first passage has an axis forming an acute angle with said axis of said cup and inclined back away from said rim.

7. The accessory defined in claim 1; further comprising a formation between said shank and said bit rotationally coupling same together.

8. The accessory defined in claim 1, wherein said bore is formed with a radially inwardly open groove forming said second passage and extending axially between said first passage and said cup, whereby particles can be aspirated from said cup to said first passage along said groove.

9. The accessory defined in claim 1, wherein said shank is formed with a radially outwardly open groove forming said second passage and extending axially between said first passage and said cup, whereby particles can be aspirated from said cup to said first passage along said groove.

10. The accessory defined in claim 1, wherein said drill fits snugly in said bore and is formed with said second passage opening at a rear end at said passage and at a front end in said cup.

* * * * *